United States Patent [19]

Kratochvil

[11] 4,397,746
[45] Aug. 9, 1983

[54] DIAPHRAGM TYPE CAKE COMPRESSOR FOR FILTER PRESSES

[76] Inventor: Russell F. Kratochvil, 13 S. Adams St., North Aurora, Ill. 60542

[21] Appl. No.: 343,446

[22] Filed: Jan. 28, 1982

[51] Int. Cl.³ .............................................. B01D 25/12
[52] U.S. Cl. .................................... 210/228; 210/231; 210/350; 100/197; 100/211
[58] Field of Search ................................ 100/194–198, 100/211; 210/770, 224–231, 350, 351

[56] References Cited

U.S. PATENT DOCUMENTS

| | | | |
|---|---|---|---|
| 3,988,242 | 10/1976 | Kurita et al. | 210/227 |
| 4,194,977 | 3/1980 | Kubota et al. | 210/231 |
| 4,237,009 | 12/1980 | Kurita | 210/227 |
| 4,251,373 | 2/1981 | Nakamura | 210/228 |

Primary Examiner—Ivars C. Cintins
Attorney, Agent, or Firm—McWilliams, Mann, Zummer & Sweeney

[57] ABSTRACT

A diaphragm type cake compressor for filter presses employing recessed plates, which compressor comprises a planar panel of quadrilateral configuration and formed from a suitable inert material to define a lower central slurry feed through opening and at its corner portions at least one filtrate passing aperture and at least one separate wash passing aperture, which panel has applied to each face of same an elastomeric membrane, which membranes are secured in place by double sided adhesive tape applied about the margins of the panel and membranes, in circumambient relation thereto, with the membranes being coupled together and through the panel slurry feed through opening in sealing relation thereto to define the slurry feed through port of the compressor, and with the membrane being apertured to correspond to the panel filtrate and wash apertures, which apertures are sealed off from the slurry by adhesive tape bonding of the membranes to the panel. The compressor in use is inserted as a unit between adjacent recessed plates to bisect the cake chamber defined thereby, and is arranged for compressed gas deflection of the membranes on either side of the compressor to compress the cake.

14 Claims, 7 Drawing Figures

U.S. Patent   Aug. 9, 1983   Sheet 1 of 2   4,397,746
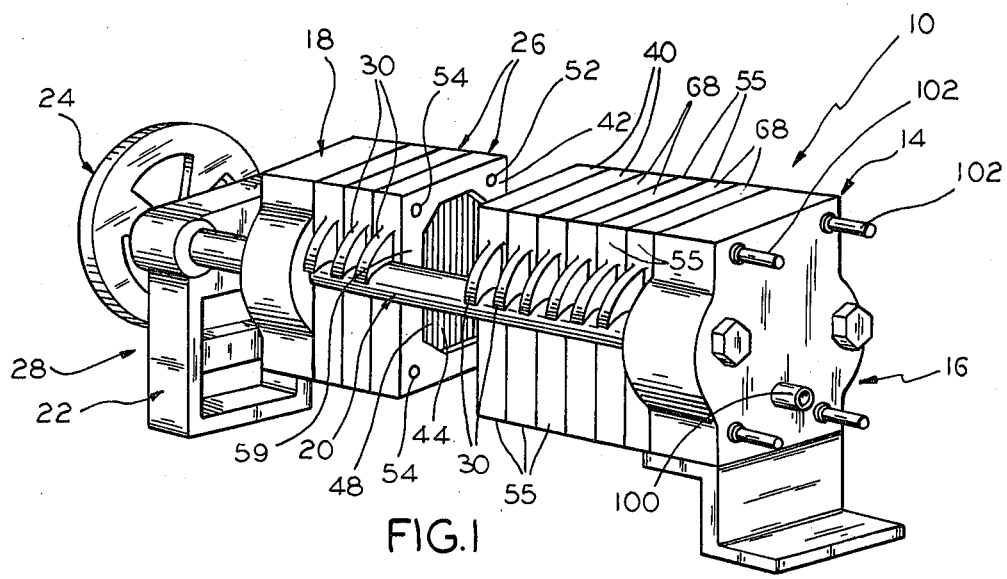
FIG.1
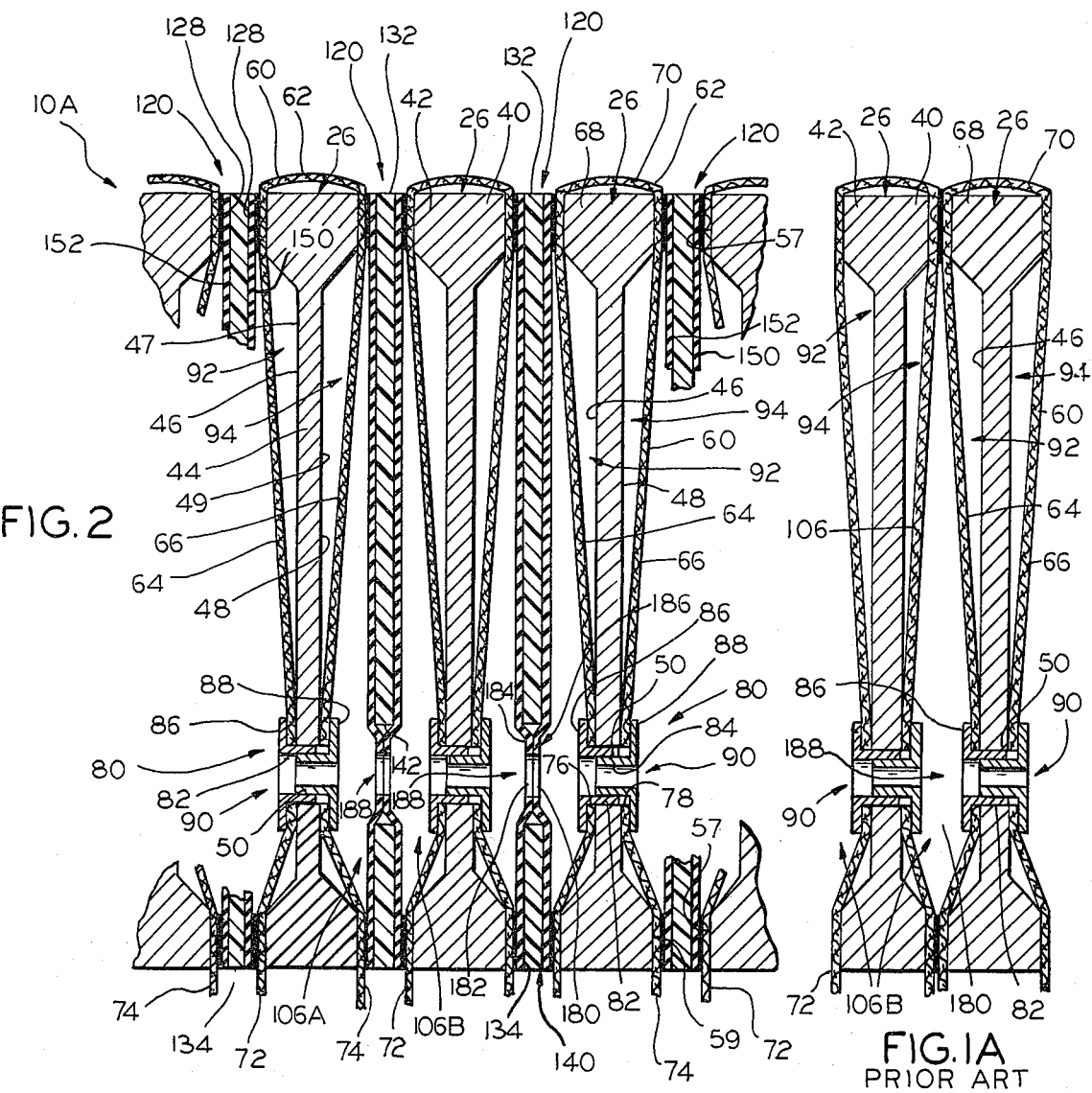
FIG.2
FIG.1A
PRIOR ART

DIAPHRAGM TYPE CAKE COMPRESSOR FOR FILTER PRESSES

This invention is directed to a diaphragm type cake compressor for filter presses, and more particularly, is directed to a diaphragm type cake compressor panel assembly for application to recessed plate type filter presses.

Filter presses are available in two main types, namely the flush plate and frame type, and the recessed plate type. Both types contemplate that the plates, and, in the case of the flush plate and frame type, the frames, are applied between a fixed head and a movable head on a framework that includes horizontal bars connecting the heads, with suitable clamp means being provided to clamp the movable plate components involved against the fixed head for filtering purposes, assuming that the plates have been suitably equipped with filter media that is typically cloth or paper in sheet form. The plates are ported for application of the slurry to be filtered through the filter media, and for removal of the resulting filtrate, as well as wash applications. As filtering proceeds, cake builds up against the filter media in the cake chambers defined by the equipment involved, which generally requires removal after a period of use, which period has a length that will depend on the materials being filtered. The cake involved usually contains residual liquid that desirably is retrieved from the cake to increase the filtrate that results, at least before removal of the cake by wash or otherwise.

In the case of recessed plates, each such plate is recessed on either side of same so that adjacent recess plates form the cake chamber between adjacent plates. Efforts have been made to employ fluid pressure actuated diaphragms in connection with recessed plates to press the cake to recover from same the residual liquid trapped therein. However, it has become common practice to form both the recessed plate and the diaphragm or diaphragms associated therewith from polypropylene, which makes bonding of the diaphragms to the plates difficult. Furthermore, polypropylene diaphragms have proved to be very troublesome due to their susceptibility of rupture as they do not distend or stretch in use.

A principal object of the present invention is to provide a diaphragm arrangement for use with recessed plates that avoids the prior problems with diaphragms in this art, and that provides a cake compressor assembly that is arranged for application as a unit between adjacent plates of a recessed plate type filter press, either as original equipment, or for improving existing recessed type plate filter press equipment.

Another principal object of the invention is to provide a diaphragm type cake compressor or unit for application as a unit to recessed plate type filter presses, which employs a supporting body forming, planar panel that may be formed from any suitable inert material, and planar membranes on either side of same that are formed from a suitable elastomeric material that are simply but securely bonded to the panel and yet distend resiliently as needed under fluid (gaseous or liquid) pressures to squeeze dry the cake and resiliently return to original planar retracted relation on release of the fluid pressures.

Still another principal object of the invention is to provide a diaphragm type cake compressor that is applied between adjacent recessed plates to bisect the cake chamber defined thereby, and that includes on either side of same an elastomeric membrane that is distensibly deflected against cake by fluid under pressure, such as air, and that in being so deflected, operates only on one vertical half of the cake normally formed between adjacent recessed plates.

Yet other objects of the invention are to provide a diaphragm type cake compressor of few and simple parts, that can be employed with equal facility in connection with both new and existing recessed plate type filter presses, without modification of the latter, and especially the recessed plates thereof, and that is economical of manufacture and assembly, easy to install and use, long lived in operation, and adapted for ready replacement and/or repair as needed.

In accordance with the invention, a diaphragm type cake compressor for filter presses employing recessed plates is provided comprising a planar body forming panel of a quadrilateral configuration similar to that of the recessed plates in connection with which the compressor is to be used. The panel defines a lower center slurry feed through opening, and at its corner portions is formed to define at least one filtrate passing aperture, and at least one separate wash passing aperture. The panel on either side of same defines planar parallel faces having marginal portions in circumambient relation thereabout that are coplanar with the planes of the respective faces of which they are a part.

Associated with each panel face is a membrane formed from a suitable elastomeric, fluid impervious material that has a quadrilateral configuration conforming to that of the panel, with double faced adhesive tape of a suitable commercial type being applied about the margins of each panel face to adhere the tape to the respective panel faces, and to adhere the membrane that is to be applied to the panel face involved to such panel face, and about the margins of the membrane involved.

The membranes are coupled together through and about the panel slurry feed opening to define a slurry feed port through the compressor assembly involved, which port has a continuous annular fluid tight seal thereabout. The membranes are apertured at their corner portions in alignment with the respective panel apertures to define through the compressor assembly the needed filtrate passing porting and the needed wash passing porting, with such porting being sealed from the slurry by application of segments of the indicated tape between the respective membranes and the panel faces involved to isolate such porting therefrom.

The membranes on either side of the panel, between the slurry feed port and the fluid tight bond providing double faced tape, provide a resiliently flexible or inflatable portion that is free to deflect laterally of the panel and away from the panel face opposing same, to form a cake compressing, resiliently inflatable diaphragm portion on either side of the panel, with the panel including means for applying fluid under pressure between the respective panel faces and the indicated membrane diaphragm portions for inflating the indicated membrane diaphragm portions into cake compressing relation with the cake, when the unit is applied in use.

The cake compressor assembly unit in use is applied between adjacent recessed plates of recessed plate type filter presses, so as to vertically bisect the cake chamber formed thereby, the panel of the individual compressor being provided with the usual laterally extending arms or handles that are comparable to those of the conventional recessed plates for support on the filter press frame supporting side rails or bars. When the recessed plates and movable head are clamped against the filter press fixed head, the cake compressors that alternate with the respect recessed plates are correspondingly clamped in operating position. During the filtering of the slurry, the operation of the filter press is the same as for conventional recessed plate filter presses, except that the cake builds up on either side of the cake compressors in the space that now amounts to one-half the conventional recessed plate cake chamber. When it is desired to compress the cake to squeeze out the residual liquids contained therein, fluid under pressure, such as compressed air, is applied to the respective panels to deflect the respective membranes of same outwardly of the respective panel faces to compress the cake and squeeze the entrapped liquids through the filter media for addition to the filtrate. Washing of the plates and separation of same to remove the cake may be effected utilizing conventional procedures, and when the plates are separated to remove the cake, the individual cake compressors may be inspected and readily repaired or replaced as a unit, on the spot, as needed.

Other objects, uses, and advantages will be obvious or become apparent from a consideration of the following detailed description and the application drawings in which like reference numerals indicate like parts throughout the several views.

In the drawings:

FIG. 1 is a diagrammatic perspective view illustrating a typical recessed plate type filter unit to which the invention is applicable;

FIG. 1A is a diagrammatic vertical sectional view taken along the center line of the filter press diagrammatically illustrated in FIG. 1, with the recessed plates thereof clamped prior art style for filtering operation, illustrating the cake chamber that is formed by an adjacent pair of such recessed plates;

Figure 3:
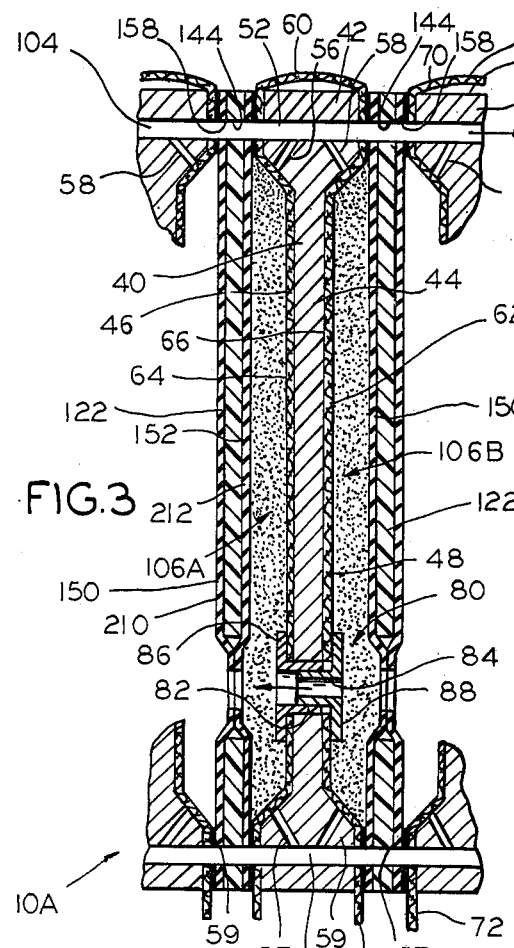
Figure 4:
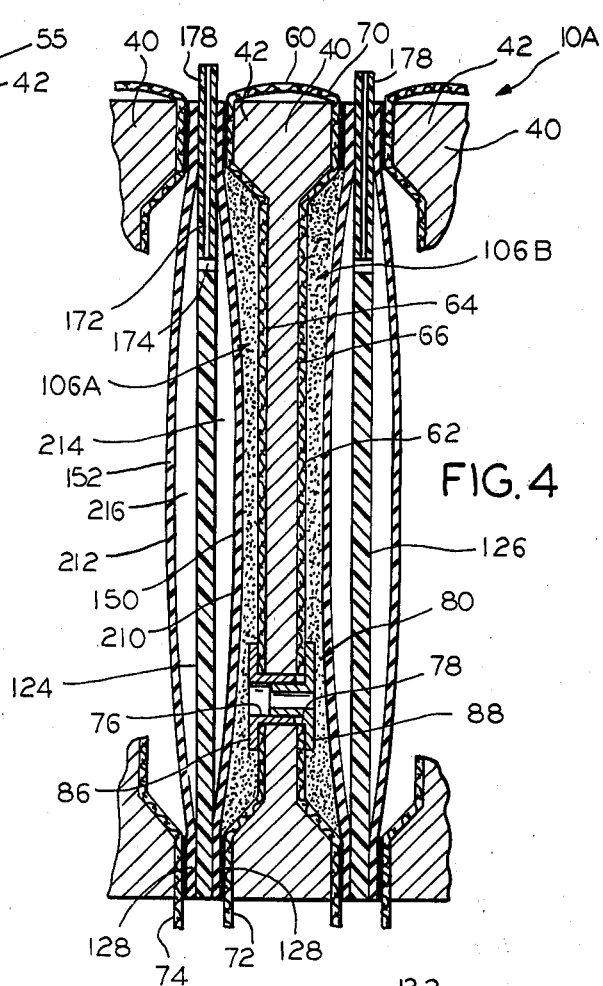
Figure 5:
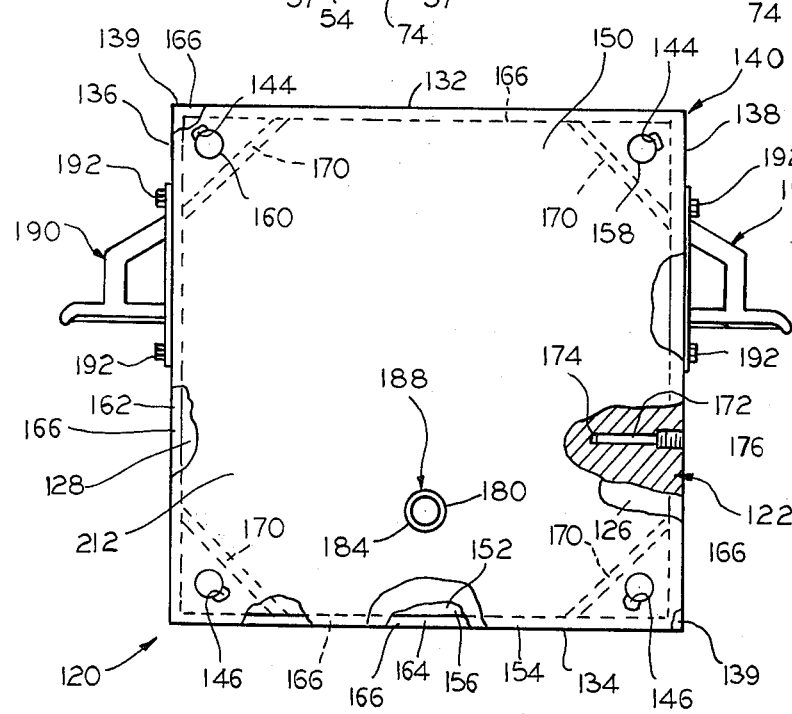
Figure 6:
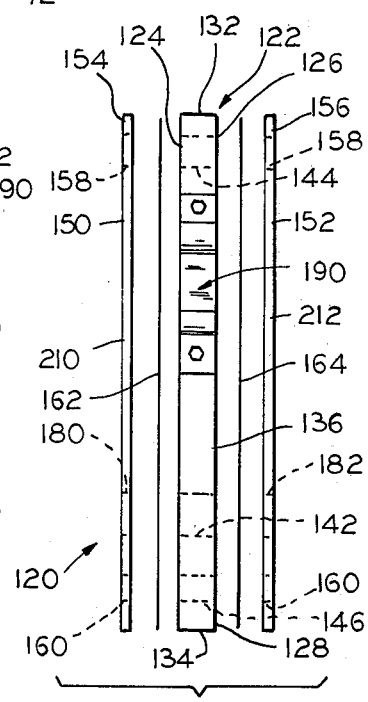

FIG. 2 is a diagrammatic vertical sectional view taken along the longitudinal center line of the filter press diagrammatically illustrated in FIG. 1, but shown having applied thereto several cake compressors arranged in accordance with the present invention to provide a recessed plate filter press in accordance with this invention, with the filter media of the recessed plates and the cake compressor membranes shown at their relative positions prior to application of the slurry to the filter press;

FIG. 3 is a view similar to that of FIG. 2, but taken on a diagonal through the recess plates and cooperating cake compressors to illustrate the nature of apertures of these components that form the filtrate and wash porting of the filter press, and showing also the slurry lower center through porting and indicating the nature of the slurry and filtrate flows involved when the filter press is being used for filtration purposes;

FIG. 4 is a view similar to that of FIG. 2 but illustrating the nature of porting of the cake compressor panels for application to same of compressed fluid, such as compressed air, to inflate the elastomeric membranes diaphragm fashion against the built up cake to press the liquids entrapped in the cake through the filter media and thus add some to the filtrate that emerges from the filter press, with the cake compressor compressed air receiving porting being displaced for illustrative purposes from the side edge location of same shown in FIG. 5;

FIG. 5 is an elevational view, partially in section, showing a cake compressor assembly or unit as arranged in accordance with the present invention with parts broken away; and FIG. 6 is an exploded edge elevational view of same.

However, it is to be distinctly understood that the specific drawing illustrations provided are supplied primarily to comply with the requirements of the Patent Laws, and that the invention is susceptible of modifications and variations by those skilled in the art, which are intended to be covered by the appended claims.

Reference numeral 10 of FIG. 1 diagrammatically illustrates a recess plate type filter press of the type to which the invention is applicable which comprises a fixed head 14 which forms a part of a fixed end support 16, the slide or movable head 18 that is mounted on the filter press side rails or bars 20 (only one of which is shown in FIG. 1) that extend between the fixed head 14 and the fixed support 22 at the movable head end of the filter press. The slide or movable head 18 is moved into place by operating a well known screw device, as by employing a familiar type of actuating gear 24, with conventional recessed plates 26 being applied in abutting relation between the fixed and movable heads and disposed transversely of side rails or bars 20, that together with fixed end support 16 and fixed head support 22 form filter press frame 28 that is suitably fixedly mounted on the usual supporting floor structure (not shown).

As is conventional in this art, the recessed plates 26 are each provided with laterally extending handles or arms 30 on either vertical side of same that are generally planar in configuration and engage the respective side rails or bars 20 on either side of the filter press for support thereby.

The diagrammatic showing of FIG. 1 for convenience of illustration leaves out the conventional filter media and the cake compressor units of the present invention, which are shown on an enlarged scale in FIGS. 2-4. As indicated in these figures, the individual recess plates 26, which are quadrilateral in marginal outline configuration, as indicated in FIG. 1, each comprise a generally planar body 40, that may be formed from polypropylene or the like to define a circumambient rim portion 42 of an enlarged thickness that bounds a panel portion 44 of reduced thickness, which is defined by recesses 46 and 48 on either side of same. The bodies 40 are each formed in their lower center portions with the usual slurry feed through opening 50. The bodies 40 that form the plates 26 also are formed with one or more filtrate exit apertures or eyes 52 and wash apertures or eyes 54, the number, orientation and location of which per se is entirely conventional and depends upon the specific type of recess plate involved and system of washing that the particular filter press 10 is to have. As is well known in the art, the apertures or eyes 52 and 54, when plates 26 are in clamped, filter press operating relation, are respectively aligned along the filter press to define liquid flow manifolds for the respective purposes indicated. The eyes or apertures 52 and 54 are normally formed in the corner portions 55 of the plates 26, in their rim portions 42 to extend between the planar packing surfaces 57 and 59 that are on either side of the respective plates 26, and that are coplanar with the plane of the individual plate 26 they are part of.

The recesses 46 and 48 of the plates 26 may be conventionally grooved for fluid flow guide purposes (shown only in FIG. 1); as indicated in FIG. 3, the individual plates 26 are each formed with the respective passages 56 and 58 that communicate the respective recess plate recesses 46 and 48 with the plate filtrant receiving apertures 52; for wash purposes the individual plates 26 may be each formed with passages 57 and 59 that communicate the plate wash apertures 54 with the respective plate recesses 46 and 48.

The individual plates 26 each have applied over their respective recesses 46 and 48 suitable filter media, such as the filter cloth 60, which in the form diagrammatically illustrated comprises, a filter sheeting 62 for each plate 26 having one side section 64 of same on the recess 46 side of the plate, and the other side section 66 applied to the other recess 48 of same in the manner diagrammatically illustrated in FIGS. 2-4, with the sheeting 62 being arced over the top 68 of the plate, as indicated at 70, and the ends 72 and 74 of same extending downwardly and somewhat outwardly of the filter press. The side sections 64 and 66 of each sheet 62 are apertured as at 76 and 78 for seal clamping against the panel portion 44 of the plate, by conventional lock nut type grommet assemblies 80 that comprise telescoping threadedly connected annular portions 82 and 84 that are each flanged as indicated at 86 and 88, respectively, for firmly clamping the filter sheet sections 64 and 66 against the plate panel portion 44 in the manner indicated in FIG. 2, to thereby define a slurry feed through port 90 for each plate 26, as well as filtrate collecting chambers 92 and 94 that are disposed in a more or less off center annular manner about the coupling devices 90 and that are in communication with the plate filtrate eyes or apertures 52 through the respective passages 56 and 58.

The recessed plates 26 are applied to the filter press 10 with the slurry feed through ports 90 and the eyes or apertures 52 and 54 respectively aligned. The ports 90 are preferably formed in the lower center portion of the plates 26, with the slurry being supplied to the filter press 10 through suitable inlet 100 and the filtrate emerging from the filter press through one or more suitable outlets 102 that are aligned with the plate filtrate apertures 52, which in the assembled relation of the filter press are aligned to define filtrate exit passages or manifolds 104 that communicate with the filtrate outlets 102, which may be one or more in number corresponding with the same number of the filtrate passages 104, depending on the type of recessed plate press that may be involved.

The plates 26 as assembled in a filter press 10 are normally in side by side abutting relation, and the abutting plates 26 define on either side of same and between same a cake chamber 106 of the type shown in FIG. 1A into which the slurry or filtrant passes from the respective feed through ports 90. As the liquids of the slurry pass through the filter media sections 64 and 66, a cake of solids is deposited within the respective cake chambers 106. When this cake has reached the point where it must be removed or reduced by employing a suitable wash procedure or separating the plates, it is frequently desirable to compress the cake to free from same the liquids that are trapped in the cake so that they may be added to the filtrate emerging from the filter press to increase the yield involved, which may be substantial for filter presses involving a large number of recessed plates.

In accordance with the present invention, the cake compressor or assembly or unit 120 is provided for cake compressing purposes, which is adapted to be applied as a unit between adjacent recess plates 26, as indicated in FIGS. 2-4, to provide filter press 10A that is arranged in the manner diagrammatically illustrated in FIG. 1, but with the cake compressors 120 interposed between adjacent recess plates 26, in the manner indicated in FIGS. 2-4.

The cake compressor assemblies 120 each comprise (see FIGS. 5 and 6), a panel 122 that is essentially planar in configuration to define oppositely facing planar faces 124 and 126, which faces 124 and 126 each include a continuous marginal portion 128 in circumambient relation thereabout, which marginal portions 128 are in coplanar relation with respective faces 124 and 126. The panel 122 defines upper and lower marginal side edges 132 and 134 and vertical side edges 136 and 138 that together define a marginal rim configuration 140 having an outline that approximates the corresponding marginal outline of the respective plates 26.

The panel 22 is formed with a lower center slurry feed through opening 142 that is positioned for alignment with the recessed plate feed through openings 50 in the assembled relation of the filter press 10A, as well as one or more filtrate receiving apertures 144 and one or more wash receiving apertures 146, the number of which will correspond to the corresponding apertures 52 and 54 of plates 26 with which the apertures 144 and 146 are to be aligned in the assembled relation of the filter press 10A.

The cake compressor 120 further comprises a resiliently flexible and distendable membrane 150 that is bonded to the marginal portion 128 of the panel face 124, and the similar resiliently flexible and distendable membrane 152 that is bonded to the corresponding marginal portion 128 of the face 126. The membranes 150 and 152 are formed from a suitable elastomeric, fluid flow impervious material, such as a natural rubber or a synthetic rubber, such as neoprene or butyl or nitrile rubber, which materials are characterized in that they stretch under tension, have a high tensile strength, retract rapidly, and fully recover their original dimensions.

Elastomeric materials of the type indicated are identified at pages 232 and 233 of Hackh's Chemical Dictionary (4th Edition, 1969).

The membranes 150 and 152 define marginal portions 154 and 156 thereabout that are of a quadrilateral configuration corresponding to the rim portion 140 of panel 122. Membranes 150 and 152 are formed to define apertures 158 and 160 that are to be aligned with the panel apertures 144 and 146, respectively, in the assembled relation of the unit or assembly 120.

Further in accordance with the invention, the membranes 150 and 152 are adhered to the respective faces 124 and 126 of panel 120 by suitable bonding techniques about the margins of the respective faces 124 and 126 and the respective membranes 150 and 152. In the form illustrated, this is effected by employing conventional double faced pressure sensitive adhesive tape stripping 162 and 164 that is interposed between the respective membranes 150 and 152 and the panel faces 124 and 126 to which they are bonded.

One suitable double faced pressure sensitive adhesive tape employed by the Applicant for this purpose is the 3M Company five mill Y9469 product, or any of that Company's Y series pressure sensitive adhesive tape products; the tape product of the type in question is commercially available in roll form and has a protective cover which in the convoluted rolled up form of the tape protects both sides of the tape, so that when the tape is unrolled from the roll and the cover is separated from the tape, both sides of the tape bear exposed pressure sensitive adhesive that is available for use in practicing the invention.

In applying the membrane 150 to the panel face 124, lengths 166 of the type of tape in question are applied along the margin of the top and bottom edges 132 and 134 of the panel, and along the margins of the side edges 136 and 138 thereof, with the tape end portions being suitably butted in sealing relation at the corners 139 of the panel, after which the memberane 150 is pressed against the exposed surface of the thus laid on tape stripping 162 (which may be initially applied to the panel face 124 with the tape protective cover still in place on the tape lengths 166 and facing outwardly, which cover is thereafter removed for applying the membrane 150 thereto and seal butting the tape lengths 166 at the panel corners). The stripping 164 is applied to the panel face 126 in a similar manner, with the membrane 152 being adhered to the stripping 164 in a likewise similar manner.

Prior to the adherence of the membranes 150 and 152 to the respective adhesive tape strippings 162 and 164, short tape lengths 170 are applied to the respective panel faces 124 and 126 in a similar manner in a diagonal relation to the respective panel apertures 144 and 146 (see FIG. 5), and in suitable seal butting relation to the respective strippings 162 and 164, so that the tape stripping lengths 170 on either side of panel 122 are adhered to the respective panel faces 124 and 126 with the positioning shown in FIG. 5, and when the respective membranes 150 and 152 are applied to the strippings 162 and 164, they are also adhered by the pressure sensitive adhesive involved to the stripping lenghts 170, whereby the apertures 144 and 146 and 158 and 160 and the manifolds they define are sealed from the slurry in the operative position of the cake compressor 120.

Further in accordance with the invention, the respective panels are bored to define suitable compressed gas passages 172 (see FIG. 4) that intersects cross bore 174 which opens passage 172 to the space between the respective membranes 150 and 152 on either side of the panel 122. In the normal, at rest, retracted relations of the membranes 150 and 152, they lie flat against the faces 124 and 126 in parallel relationship therewith. The passage 172 may be formed in any one of the side edges of the panel 122, although one of the vertical side edges 136 or 138 is preferred, and the passage may be shaped to define an internally threaded mouth 176 for threadedly receiving a suitable fitting 178 which is suitably connected to a suitable source of gas under pressure, for instance, by a flexible tubing for each such cake compressor 120 suitably connected to a source of compressed air available, by way of any conventional equipment suitable for this purpose (including off-on and regulatory controls therefor), at a pressure of up to about 250 psi.

The membranes 150 and 152 are formed to define the respective slurry through openings 180 and 182, with the marginal portions of the respective membranes 150 and 152 about the respective openings 180 and 182 being suitably bonded together as at 184 about the openings 180 and 182 to define an annular seal thereabout that seals off the slurry from access to the panel and its aperture 142 and defines slurry flow through port 188 of the compressor 120.

It will thus be seen that the panel 122 of the device or assembly 120 is effectively sealed from the slurry, and as a matter of fact is exposed to the filtrate only at the panel apertures 144. Consequently, the panel 122 may be formed from any suitable inert material such as wood or plywood, a metal such as stainless steel, or one of the numerous corrosion resisting plastic materials such as polypropylene, or the like. Polyethylene is preferred as the material for making panel 122 because of its corrosion free characteristics, amenability to bonding by employing double faced adhesive tape of the type indicated, and its relatively light weight and high strength and structural integrity.

The cake compressors 120 are each provided with a pair of suitable handles or arms 190 that are comparable to the corresponding handles or arms 30 in the plates 26, and may be of any suitable type appropriate for mounting the compressors 120 between the filter press frame supporting side bars 20. The handles or arms 190 may be suitably secured to the respective vertical side edges 136 and 138 of the panel 122, as by employing suitable screw connectors 192 or the like.

In use, the cake compressor assemblies 120 are applied to a filter press 10 in between the respective adjacent plates 26 to form the filter press 10A. Prior to application of the slurry to the filter press 100, the assembled component parts of the filter press will have the relation indicated in FIG. 2, in which the respective filter media sheet sections 64 and 66 are spaced somewhat from the respective floor surfaces 47 and 49 of the respective recesses 46 and 48, and the membranes 150 and 152 lie flush against the respective faces 124 and 126 of the panel 122 of each assembly 120. When slurry is applied to the filter press 10A in the usual manner, as by application under suitable pressure flow conditions to the inlet 100, the slurry flows into and through the filter press by consecutively passing through the slurry through ports 80 and 188 and rises to fill the cake chambers 106, which in the filter press 10A are bisected by the application of the assemblies 120 thereto to define separated half cake chambers 106A and 106B. The slurry rises to the top of the filter press, and as it reaches operating pressures within the filter press the liquids filter through the filter media 64 and 66 that is applied to the respective recess plates 26 to gather in filtrate chambers 92 and 94 from which the filtrate feeds to outlet channels or manifolds 104 that exit at one of the suitable connections 102.

As filtering proceeds, the presence of the slurry deflects the filter media sheet sections 64 and 66 against the filter plate recess floors 47 and 49, respectively, and the cake chambers 106A and 106B expand accordingly. The solids tend to build up on the surfaces of the filter media sections 64 and 66 that face the devices or assemblies 120 on either side of same, as, for instance, the membranes 150 and 152 of the adjacent assemblies 120 in the showing of FIG. 3. The mounting of the respective membranes 150 and 152 on the panel 122 results in the membranes 150 and 152 defining the respective diaphragm portions 210 and 212 that are free about the assembly slurry flow through ports 188 and the marginal portions of the membranes that are bonded to the respective panel faces 124 and 126, to oppositely flex and distend away from the respective panel faces 124 and 126, thereby forming compressed air chambers 214 and 216, respectively, that are collapsed when the membranes 150 and 152 return to their retracted, distension free relations of FIGS. 2 and 3 (on release or shutting off of the connection to the source of air pressure), but which are opened under the action of the compressed gas applied to the respective panels 122 to define the expanded relation diagrammatically indicated in FIG.

4. For this purpose, when the cake building up in the respective cake chambers 106A and 106B reaches the point where it needs to be compressed or squeezed to remove therefrom the liquids that are embedded in same, the passages 172 of the respective panels 122 are supplied with compressed gas under pressure, for instance compressed air at the appropriate pressure, which may be in the range of from about 120 to about 250 psi, to squeeze or compress the cake in the respective chambers 106A and 106B in the manner suggested in FIG. 4. This action presses through the filter media sheet sections 64 and 66 involve the entrapped liquids that in turn pass to the filtrate discharge passage or passages 104 to supplement the filtrate that emerges from the filter press. The inflated shaping of membranes 150 and 152 is block diagram illustrated in FIG. 4; the shaping in practice tends to more nearly roughly follow the contour of the respective plate recesses the respective membranes 150 and 152 are inflated toward, depending on the nature of the materials making up the cake.

When the compression of the cake has been completed, as evidenced by the lack of filtrate emerging from the filter press, the compressed air from the panels 122 is released, and the cake is washed or otherwise separated from the plates 26 in any conventional manner, which may involve separating of the plates or utilizing one of the standard symbol or through wash procedures known to the art, depending on the design of the specific plates 26 that are involved.

It will thus be seen that the invention provides a cake separator that may be employed as a unit between conventional recessed plates to vertically bisect or divide the cake chambers defined by same. The diaphragm portions 210 and 212 that are formed by the respective membranes 150 and 152 are operative as cake compressing diaphragms to compressingly act on one half the cake chamber that is defined by conventional filter presses equipped with conventional recessed filter plates 26. The membranes 150 and 152 are very simply but firmly adhered to the panels 122, and should either membranes 150 and 152 become defective, it can easily be peeled off the panel and replaced by a similar membrane of the same size and arrangement.

The cake compressors 120, as indicated, may be applied between adjacent recessed plates 26 as a unit, and the same units may be employed for both new filter press equipment that includes the conventional recess plates 26, or to improve and update used filter presses equipped with the conventional recess plates 26.

Further, replacement membranes 150 and 152, for retro fitting existing presses 10A, or cake compressors 120 therefor, may be readily made available as repair parts already equipped with strippings 162, 164 and 170 applied thereto, that have their facings that are to adhere to the faces 124 and 126 of the panel 122 provided with a suitable protective cover strippings that can be removed by hand for substituting a new membrane 150 or 152 for corresponding used membranes that are defective.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:

1. In a filter press that includes a plurality of recessed plates operably disposed between a fixed end plate and a movable end plate, with said plates being of like corresponding quadrilateral margin configuration, with said recessed plates each defining a slurry feed port, a filtrate outlet means, and a wash inlet means, with each said recessed plate being shaped to define a planar packing surfacing on either side of same and recessing between said packing surfacing and the slurry feed port that is in fluid flow communication with said filtrate outlet means, with filter sheeting material being applied over either side of each plate, and with the filter sheeting material of each plate on either side of same being coupled together through the slurry feed port, and means for closing said movable end plate and said recessed plates against the fixed plate with said recessed plate slurry feed ports aligned for supplying the slurry to the cake chamber formed by each pair of adjacent recessed plates about the slurry feed ports thereof for filtering the slurry through the filter sheeting material that is disposed on either side of the respective cake chambers for providing filtrate liquid flow to said filtrate outlet means, the improvement comprising a cake compressor arrangement therefor comprising cake compressors interposed in alternating relation along the filter press with the respective recessed plates whereby one of said cake compressors is disposed across each cake chamber in bisecting relation thereto, each of said cake compressors comprising:

a planar panel of quadrilateral marginal configuration having oppositely facing side faces on either side of same, with each side face having a continuous marginal portion about the rim of the panel corresponding in configuration to the panel marginal configuration, said panel marginal configuration conforming to said marginal configuration of said plates, and with each said panel side face including its marginal portion being planar and coplanar with the plane of said panel, said panel being formed at a site spaced from said face marginal portions thereof with a slurry feed through opening that is aligned with said slurry feed ports of the respective recessed plates, said panel configuration defining corner portions at the upper and lower ends of the panel, with at least one panel corner portion defining a filtrate passing aperture and with at least one other panel corner portion defining a wash passing aperture, said filtrate passing aperture and said wash passing aperture being aligned with said filtrate outlet means and said wash inlet means of said recessed plates, respectively, a pair of elastomeric membranes for each said panel and each said membrane having a quadrilateral configuration approximating that of said panel whereby said membranes each having a marginal configuration thereabout that approximates the marginal configuration of the respective panel faces, with one of said membranes for each said panel being disposed against one face of said panel and the other of said membranes for each said panel being disposed against the other face of said each panel, and with said membranes of the respective membrane pairs being bonded to said panel thereof continuously about the respective marginal portions of said panel faces, respectively, to define a continuous static seal thereabout, said membranes of said membrane pairs, respectively, being coupled together through and about their panel, said slurry feed through opening in sealed relation thereto to define a slurry feed port through said compressor having a continuous annular seal thereabout, said membranes of the respective membrane pairs being bonded to said faces, respectively of said panel thereof, in sealed relation thereto about said panel apertures to define aperture seals for each membrane pair about the respective apertures of said panel thereof, said membranes of said membrane pairs being apertured in alignment with the respective apertures of said panel thereof to define through the respective compressors a filtrate passing opening and a wash passing opening respectively aligned with said filtrate outlet means and said inlet means, said membranes of each said membrane pair each defining a portion of same, between said annular seal and said static seal of the respective compressors to the exclusion of said aperture seals of the respective compressors, that is free to deflect laterally thereof and away from the panel face opposing same, to form a cake compressing diaphragm portion on either side of said panel of the respective compressors, said panel of the respective compressors including means for supplying fluid under pressure between its said faces and said membrane diaphragm portions for inflating said membrane diaphragm portions into cake compressing relation with the cake when formed between same and the filter sheeting opposing same.

2. The improvement set forth in claim 1 wherein for each said cake compressor:

said bonding comprises double faced adhesive tape stripping along said static seal at the respective marginal portions of the respective panel faces and diagonally of said panel corner portions to form said static seal and said apertures seals respectively, with one face of the tape being adhered to the panel and the other face of the tape being adhered to the membrane at the respective faces of said panel.

3. The improvement set forth in claim 2 wherein for each said cake compressor:

said panel defines side edges that form said marginal configuration thereof, said supplying means comprises said panel being formed to define passages leading from one of said side edges to the respective membrane diaphragm portions.

4. The improvement set forth in claim 2 wherein for each said cake compressor:

said panel is formed from a rigid inert material, and said membranes are formed from a nitrile rubber elastomer.

5. The improvement set forth in claim 2 wherein for each said cake compressor:

said panel is formed from a rigid inert material, and said membranes are formed from a synthetic elastomeric material.

6. For use in a recessed plate type filter press that includes a plurality of recessed plates operably disposed between a fixed end plate and a movable end plate, with said plates being of like corresponding quadrilaterial marginal configuration, with said recessed plates each defining a slurry feed port, a filtrate outlet means, and a wash inlet means, with each said recessed plate being shaped to define a planar packing surfacing on either side of same and recessing between said packing surfacing and the slurry feed port that is in fluid flow communication with said filtrate outlet means, with filter sheeting material being applied over either side of each plate, and with the filter sheeting material of each plate on either side of same being coupled together through the slurry feed port, and means for closing said movable end plate and said recessed plates against the fixed plate with said recessed plate slurry feed ports aligned for supplying the slurry to the cake chamber formed by each pair of adjacent recessed plates about the slurry feed ports thereof for filtering the slurry through the filter sheeting material that is disposed on either side of the respective cake chambers for providing filtrate liquid flow to said filtrate outlet means, a cake compressor therefor for operative position application across a recessed plate defined cake chamber formed by a predetermined pair of the adjacent recessed plates, in bisecting relation to such cake chamber, and between such predetermined pair of recessed plates and the filter sheeting material of the respective plates of such predetermined pair of plates on the confronting sides of same, said cake compressor comprising:

a planar panel of quadrilateral marginal configuration having oppositely facing side faces on either side of same, with each side face having a continuous marginal portion about the rim of the panel corresponding in configuration to the panel marginal configuration, said panel marginal configuration conforming to said marginal configuration of said plates, and with each said panel side face including its marginal portion being planar and coplanar with the plane of said panel, said panel being formed at a site spaced from said face marginal portions thereof with a slurry feed through opening that is positioned to be aligned with said slurry feed ports of the respective recessed plates when said compressor is applied to said such chamber, said panel configuration defining corner portions at the upper and lower ends of the panel, with at least one panel corner portion defining a filtrate passing aperture and with at least one other panel corner portion defining a wash passing aperture, said filtrate passing aperture and said wash passing aperture of said panel being positioned to be aligned with said filtrate outlet means and said wash inlet means of said recessed plants, respectively, when said compressor is applied to said such cake chamber, a pair of elastomeric membranes for said panel and each said membrane having a quadrilateral configuration approximating that of said panel whereby said membranes each having a marginal configuration thereabout that approximates the marginal configuration of said panel faces, with one of said panel membranes being disposed against one face of said panel and the other of said panel membranes being disposed against the other face of said panel, and with said panel membranes being bonded to said panel continuously about the respective marginal portions of said panel faces, to define a continuous static seal thereabout, said panel membranes being coupled together through and about said slurry feed through opening in sealed relation thereto to define a slurry feed port through said compressor having a continuous annular seal thereabout, said panel membranes being bonded to said panel faces in sealed relation thereto about said panel apertures to define aperture seals for each membrane about the respective panel apertures, said panel membranes being apertured in alignment with the respective apertures of said panel to define through the compressor a filtrate passing opening and a wash passing opening respectively positioned to be aligned with said filtrate outlet means and said inlet means, respectively, when said compressor is applied to said such chamber, said panel membranes each defining a portion of same between said annular seal and said static seal, to the exclusion of said aperture seals, that is free to deflect and distend laterally thereof and away from the panel face opposing same, to form a cake compressing diaphragm portion on either side of said panel, said panel and said side faces thereof being substantially coextensive with and being disposed between said portions of said membranes, said panel including means for supplying fluid under pressure between its said faces and said membrane diaphragm portions for inflating said membrane diaphragm portions into cake compressing relation with the cake when said compressor is applied to said such chamber and such cake is formed between same and the filter sheeting of said such chamber confronting same.

7. The cake compressor set forth in claim 6 wherein:
said bonding comprises double faced adhesive tape stripping along said static seal at the respective marginal portions of the respective panel faces and diagonally of said panel corner portions to form said static seal and said aperture seals respectively, with one face of the tape being adhered to the panel and the other face of the tape being adhered to the membrane at the respective faces of said panel.

8. The cake compressor set forth in claim 7 wherein:
said adhesive tape is of the pressure sensitive type.

9. The cake compressor set forth in claim 6 wherein:
said panel defines side edges that form said marginal configuration thereof,
said supplying means comprises said panel being formed to define passages leading from one of said side edges to the respective membrane diaphragm portions.

10. The cake compressor set forth in claim 6 wherein:
said panel is formed from a rigid inert material,
and said membranes are formed from a nitrile rubber elastomer.

11. The cake compressor set forth in claim 6 wherein:
said panel is formed from a rigid inert material,
and said membranes are formed from a synthetic elastomeric material.

12. A recessed plate filter press comprising the filter press set forth in claim 6 wherein:
each of said cake chambers thereof has one of said cake compressors disposed as a unit in said operative position thereacross in said bisecting relation thereto with said clamping means effecting clamping of the respective cake compressors between the pair of confronting recessed plates that form the cake chamber that is bisected by the respective cake compressors.

13. The recessed plate filter press set forth in claim 12 wherein:
said cake compressors are retrofitted in the respective cake chambers.

14. In a recessed plate filter press comprising the filter press of claim 12,
a replacement membrane for replacing one of said panel membranes of one of said cake compressors,
said replacement membrane being identical to said panel membranes and having adhered to one side of same, one side of double faced pressure sensitive adhesive tape stripping positioned thereon congruent to the position of said static seal of said panel membranes on said panel membranes, with the other side of said tape stripping being overlaid with a protective covering,
whereby on removing one of said panel membranes from one of said cake compressors and removing said protective covering from said replacement membrane tape stripping, said replacement membrane may be adhered to said panel of said one cake compressor in replacement of said removed membrane thereof.

* * * * *